March 7, 1939. W. F. BETTIS 2,149,659
FLUID RELEASE DEVICE
Filed Aug. 10, 1937
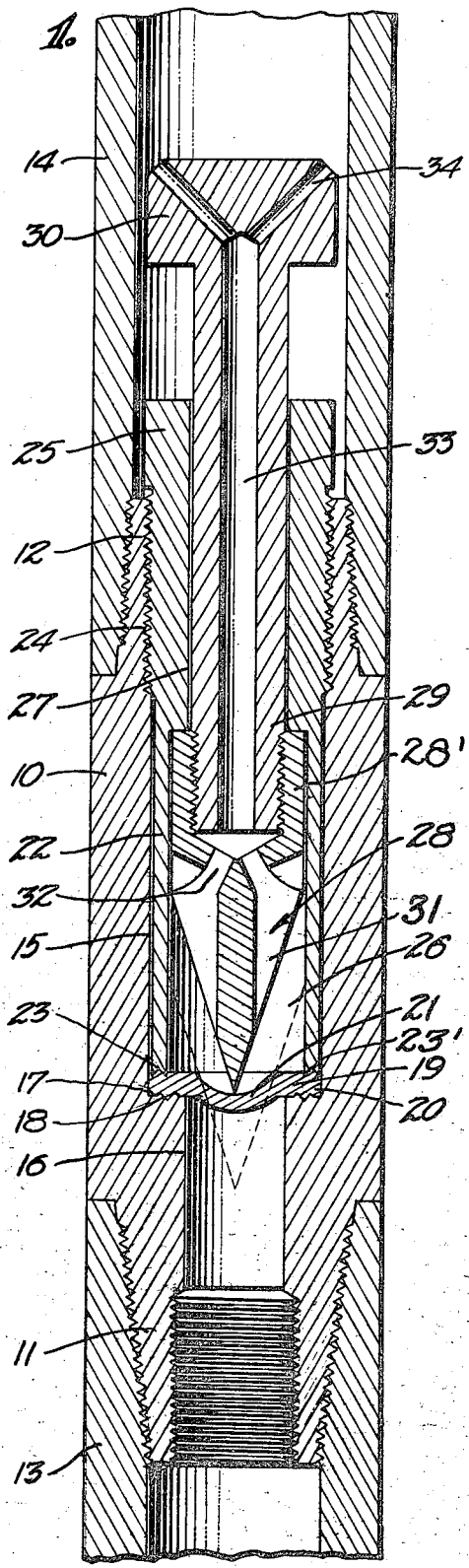
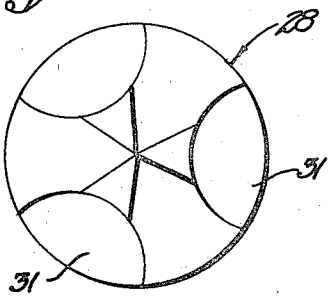
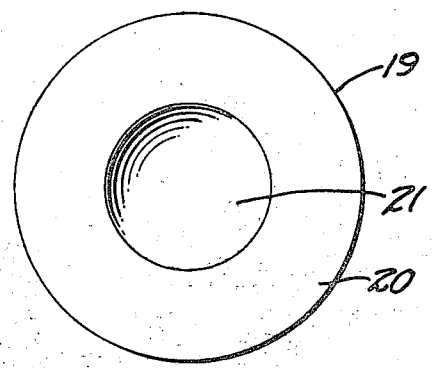
INVENTOR
WILBUR F. BETTIS
BY James M. Abbott
ATTORNEY Patented Mar. 7, 1939

2,149,659

UNITED STATES PATENT OFFICE 2,149,659

FLUID RELEASE DEVICE

Wilbur F. Bettis, Glendale, Calif., assignor to Mordica O. Johnston, Glendale, Calif.

Application August 10, 1937, Serial No. 158,400

2 Claims. (Cl. 166—1)

This invention is concerned with a device by which the control of fluid is effected and is here designated as a fluid release device.

In various industries it is desirable to confine a fluid within a conduit or container and to quickly release the fluid therefrom by simple and effective means. Such a device is desirable for use in connection with oil well operations. For example, in the making of formation and water shut-off tests of oil wells, and in which structures an empty string of drill pipe is lowered into the well and is thereafter placed in communication with the fluid at the lower end of the well by opening a valve or fluid release device. It is the principal object of the present invention to provide a fluid release device which will act to confine a fluid under pressure within a container and conduit, and thereafter permit it to be instantly released by establishing and maintaining a flow of fluid from the container or conduit, the said structure being composed of a few parts designed for rugged use and high pressures and which may be operated directly or from a remote point.

The present invention contemplates the provision of a housing adapted to be placed in communication with a conduit or fluid container, and if desired to be attached to a conduit through which the relieved fluid may flow, said housing carrying a frangible disc which may be perforated or broken by a fluid relief member and through which relief member the fluid may escape from the container or conduit.

The invention is illustrated by way of example in the accompany drawing in which:

Figure 1 is a view in central vertical section showing the device with which the present invention is concerned.

Fig. 2 is a view in end elevation showing the penetrating point of the perforating member.

Fig. 3 is a view in plan showing the frangible disc.

Referring more particularly to the drawing, 10 indicates a housing. This member is tubular having a threaded lower end 11 and a threaded upper end 12. The lower end is threaded into a coupling or boss 13 which may be part of a fluid container or a conduit. The upper end is here shown as connected with a pipe 14. This may be a flow pipe or a drill string. The housing 10 is formed throughout a major portion of its length with a large central bore 15 which terminates in a reduced bore 16 at its lower end. This provides a shoulder 17 here shown as formed with concentric V-shaped serrations 18 upon which a frangible disc 19 may be seated. The frangible disc 19 is formed of a desired material, such for example as aluminum, and to make it easy to perforate or break the disc its central portion is relatively thin and is circumscribed by a relatively thick portion. The thick portion is indicated at 20 and the thin portion is indicated at 21 where it will be seen that the thin portion is concaved and presents a convexed face to the pressure of the fluid in the passageway 16. This formation of the disc insures that the disc may be relatively thin at its center and exceedingly strong. The thick circumferential portion 20 is engaged by the lower end of a fastening sleeve 22 which sleeve is formed with a V-shaped groove 23 so that penetrating edges 23' formed thereby, and the serrations 18 will be embedded into the face of the disc above and below it. The sleeve 22 is threaded into the housing 10 at 24, the upper end of said sleeve being formed with an enlarged head 25 by which the sleeve may be screwed into its set position to bind the edges of the disc 19 against the shoulder 17. The sleeve 22 is formed at its lower end with a relatively large counterbore 26 which extends upwardly and continues in a smaller bore 27. Positioned within the large bore 26 is a perforating element 28 having a collar 28' on its upper end which is threaded on to the lower end of a tubular stem 29. The tubular stem fits slidably within the bore 27 and terminates at its upper end in an enlarged head 30. The perforating element 28 is preferably conical and terminates in a relatively sharp point and extends downwardly to contact the disc 19 at its central part. The sides of the perforating element 28 are fluted as indicated at 31 so that when the point has been driven through the disc 19 as indicated by dotted lines in Fig. 1 there will be fluid circulation passageways through the disc and around the point. These fluted portions 31 communicate with passageways 32 leading into the lower part of collar 28' which in turn conduct the flow of fluid to a central passageway 33 in the stem 29. Outlet openings 34 are formed in the head 30 of the stem to allow a flow of fluid from the passageway 33.

In operation of the present invention it will be understood that the housing 10 is connected with a member 13, such for example as a piece of pipe or tubing. The frangible disc 19 is mounted upon the shoulder 17 and forced downwardly until the ribs occurring between the V-shaped grooves 18 are embedded in the end face of the portion 20 of the frangible disc and the edges 23' of the sleeve 22 are embedded in the upper face of the frangible disc, thus making a fluid tight seal between the disc and the shoulder 17 and therearound. The perforating element 28 with its stem 29 has been mounted within the sleeve 22 and may rest with its point upon the upper face of the central portion of the frangible disc 19. The device is then ready for instant use. This may be done by striking the head 30 with some weighted object, or in certain cases it may be accomplished by dropping a weighted object through a string of pipe 14 so that it will strike the head 30 with sufficient impact to drive the point of the perforating element 28 through the disc 19 and to establish a fluid flow from the passageway 16 through the flutes 31 to the passageways 32 of the perforating element and then upwardly through the passageway 33 of the stem 29. It will be evident that if the fluid pressure beneath the frangible disc 19 is not sufficient to lift the perforating element 28 and its stem, that fluid may freely flow outwardly and that in the event this pressure is sufficient to lift the element the central perforated openings will remain. Attention is called particularly to the fact that due to the convexed formation of the frangible disc 19 it will withstand excessive fluid pressures without rupture even though the disc is made of relatively thin material.

It will thus be seen that the structure here disclosed provides simple and effective means for retaining a fluid under pressure within a container or conduit and for permitting it to be instantly released without the use of expensive valves and packing, and that after the release has been initiated the flow will continue without abatement and without necessity that the penetrating member and the disc shall be held in any particular locked position with relation to each other and the housing.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A fluid releasing device comprising a housing, walls providing a primary bore in said housing, walls providing a secondary bore in said housing communicating with said primary bore and forming a shoulder therebetween, a tubular sleeve disposed in said primary bore and having serrations on the lower end thereof, a frangible disc mounted on said shoulder and normally establishing a seal between said bores, said disc being held in sealing position by the penetration of said serrations in the marginal part thereof, a tubular stem adapted for movement within said sleeve, a perforating element having a collar threaded to the lower end of said stem, said perforating element acting to puncture said disc when moved in one direction, fluted portions forming passages in the surface of said perforating element, and walls forming openings in the lower end of said collar communicating with said passages to permit the passage of fluid through the disc after the perforating element has penetrated the same.

2. A fluid releasing device comprising a housing having a primary bore and a secondary bore and providing a shoulder therebetween, a tubular sleeve disposed in said primary bore and having serrations formed on the lower end thereof, a frangible disc mounted on said shoulder and normally providing a seal between said bores, said disc being held in position by the penetration of said serrations in the marginal part thereof, a tubular stem mounted for movement in said sleeve, a perforating element having a collar on its upper end connected to the lower end of said stem, said perforating element having a pointed end adapted to puncture said disc when said stem is moved in one direction, walls providing passages extending exteriorly along the surface of said perforating element, and walls providing openings in said collar communicating with said passages to permit passage of fluid through said disc after the perforating element has penetrated the same.

WILBUR F. BETTIS.